(12) United States Patent
Linton et al.

(10) Patent No.: US 11,676,011 B2
(45) Date of Patent: Jun. 13, 2023

(54) PRIVATE TRANSFER LEARNING

(71) Applicant: International Business Machines Corporation, Armonk, NY (US)

(72) Inventors: Jeb R. Linton, Manassas, VA (US); John Behnken, Hurley, NY (US); John Melchionne, Kingston, NY (US); Michael Amisano, East Northport, NY (US); David K. Wright, Monroe, MI (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 16/662,087

(22) Filed: Oct. 24, 2019

(65) Prior Publication Data
US 2021/0125051 A1    Apr. 29, 2021

(51) Int. Cl.
*G06F 21/53* (2013.01)
*G06F 21/62* (2013.01)
*G06N 3/08* (2023.01)
*G06N 3/04* (2023.01)

(52) U.S. Cl.
CPC ............... *G06N 3/08* (2013.01); *G06F 21/53* (2013.01); *G06F 21/6236* (2013.01); *G06N 3/04* (2013.01); *G06F 2221/031* (2013.01)

(58) Field of Classification Search
CPC .............................. G06F 21/53; G06F 21/6236
See application file for complete search history.

(56) References Cited

U.S. PATENT DOCUMENTS

| | | | |
|---|---|---|---|
| 10,257,225 B1 | 4/2019 | Sites | |
| 10,264,018 B1 | 4/2019 | Sites | |
| 11,481,483 B2 * | 10/2022 | Feng | G06F 21/6209 |
| 2015/0379072 A1 * | 12/2015 | Dirac | G06N 20/00 |
| | | | 707/693 |
| 2017/0372201 A1 | 12/2017 | Gupta et al. | |
| 2019/0034658 A1 | 1/2019 | Xie et al. | |
| 2019/0188386 A1 * | 6/2019 | Pogorelik | G06F 21/57 |

(Continued)

FOREIGN PATENT DOCUMENTS

| | | |
|---|---|---|
| CN | 109308418 A | 2/2019 |
| CN | 110162981 A | 8/2019 |
| WO | WO-2020136663 A1 * | 7/2020 ............. G06Q 30/02 |

OTHER PUBLICATIONS

Reuter, M., "Privacy Preserving Deep Neural Network Prediction Using Trusted Hardware", Master's Programme in Computer, Communication and Information Sciences, Oct. 11, 2018, 84 pages.

(Continued)

*Primary Examiner* — Daniel B Potratz
(74) *Attorney, Agent, or Firm* — Donald J. O'Brien (57) ABSTRACT

Embodiments are disclosed for a method for private transfer learning. The method includes generating a machine learning model comprising a training application programming interface (API) and an inferencing API. The method further includes encrypting the machine learning model using a predetermined encryption mechanism. The method additionally includes copying the encrypted machine learning model to a trusted execution environment. The method also includes executing the machine learning model in the trusted execution environment using the inferencing API.

18 Claims, 7 Drawing Sheets

(56) References Cited

U.S. PATENT DOCUMENTS

2021/0125051 A1     4/2021   Linton et al.

OTHER PUBLICATIONS

Gonzalez, J., "Operating System Support for Run-Time Security with a Trusted Execution Environment—Usage Control and Trusted Storage for Linux-based Systems", Ph.D Thesis, Submitted: Jan. 31, 2015, 194 pages.
Anonymous, "Sensor Network Trained to Understand Arbitrary Labels", An IP.com Prior Art Database Technical Disclosure, IP.com No. IPCOM000255129D, IP.com Electronic Publication Date: Sep. 4, 2018, 23 pages.
Anonymous, "System and Method for Comprehension and Inference of DL Model from Image Sources", An IP.com Prior Art Database Technical Disclosure, IP.com No. IPCOM000254732D, IP.com Electronic Publication Date: Jul. 26, 2018, 8 pages.
Anonymous, "Identifying and Determining Trustworthiness of a Machine-Learned Model", An IP.com Prior Art Database Technical Disclosure, IP.com No. IPCOM000252359D, IP.com Electronic Publication Date: Jan. 5, 2018, 35 pages.
Mell et al., "The NIST Definition of Cloud Computing", Recommendations of the National Institute of Standards and Technology, Sep. 2011, 7 pages.
Notification of Transmittal of the International Search Report and the Written Opinion of the International Searching Authority, or the Declaration, International Application No. PCT/IB2020/059918, dated Feb. 3, 2021, 10 pages.

\* cited by examiner

PRIVATE TRANSFER LEARNING

BACKGROUND

The present disclosure relates to private transfer learning, and more specifically, to secure portable DNNs for private transfer learning.

Deep neural networks (DNNs) are machine learning architectures. Machine learning architectures are computer systems, e.g., machines, that can learn. One thing that machines can learn is how to classify items, for example, how to distinguish images of people from images of objects. Thus, DNNs can take an image as an input, and output a label of that image, indicating whether the DNN classifies the image as a person or an object. The act of classifying objects by machine learning, e.g., DNN, models is referred to herein as an inference or a forward pass. In contrast, a backward pass involves training a DNN model, which is a computer program that learns to perform a predetermined classification. Training DNN models to be accurate can be complex, and thus rely on relatively large amounts of data to learn how to perform generic tasks such as, distinguishing images of people from images of objects.

SUMMARY

Embodiments are disclosed for a method for private transfer learning. The method includes generating a machine learning model comprising a training application programming interface (API) and an inferencing API. The method further includes encrypting the machine learning model using a predetermined encryption mechanism. The method additionally includes copying the encrypted machine learning model to a trusted execution environment. The method also includes executing the machine learning model in the trusted execution environment using the inferencing API.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

A DNN is a machine learning software architecture with multiple layers between input and output. DNNs can mathematically convert inputs to outputs using relevant parameters of the inputs and associated weights that the DNN learns to manipulate. During a training phase, DNNs can process relatively large numbers of labelled inputs and learn to manipulate the weights of the various parameters to convert the inputs into outputs that match the labels. These mathematical modifications can represent various types of mathematical relationships, including linear and non-linear. In this way, the DNN can generate generic DNN models.

Transfer learning is useful for developing generic DNN models into models that perform more specific tasks. For example, given a generic DNN model that distinguishes images of people from objects, transfer learning can develop a model that distinguishes images of the game of baseball from images of the game of cricket. Performing transfer learning can involve relatively low amounts of training data in comparison to the training data for the generic DNN model. For example, training a generic DNN model to distinguish people from objects can involve tens of thousands of labelled inputs. In contrast, developing the generic model into a transfer learning model that distinguishes images of baseball games from images of cricket matches can involve less than fifty labelled inputs. In this way, transfer learning provides advantages in reducing costs and resources in comparison to other machine learning techniques. Thus, transfer learning can build valuable DNN models that perform comparatively highly specific tasks from comparatively highly trained generic DNN models. However, the possession of such highly-trained, generic DNN models that can be developed to perform relatively highly specific tasks can implicate security concerns to protect against their use by unauthorized users, thieves, and/or other malicious actors.

Trusted execution environments can provide secure enclaves on a host computer system, wherein sensitive- or controlled-programs can be run without unauthorized introspection (viewing) or copying. In fact, trusted execution environments can even protect controlled programs from privileged administrators and processes on the computer hosting the trusted execution environment.

Accordingly, embodiments of the present disclosure can control the dissemination and use of a highly trained generic DNN model. In this way, embodiments can allow: use of the generic DNN model for inferencing in unmodified form and development of the generic DNN model into a transfer learning model with task-specific training. In contrast to the forward pass, the act of training a machine learning model is also referred to herein as a backward pass. Embodiments of the present disclosure can thus package a DNN model using encryption that cannot be opened outside of a trusted execution environment. In some embodiments, the code for the architecture, weights, and biases of the DNN is packaged with two application programming interface (API) functions. One of the API functions performs an inference on an unlabeled input. Thus, data is input without labels for a forward pass through the DNN. Another API function trains the generic DNN model. Thus, data is input with a label for a backward pass through the generic DNN model.

Figure 1:
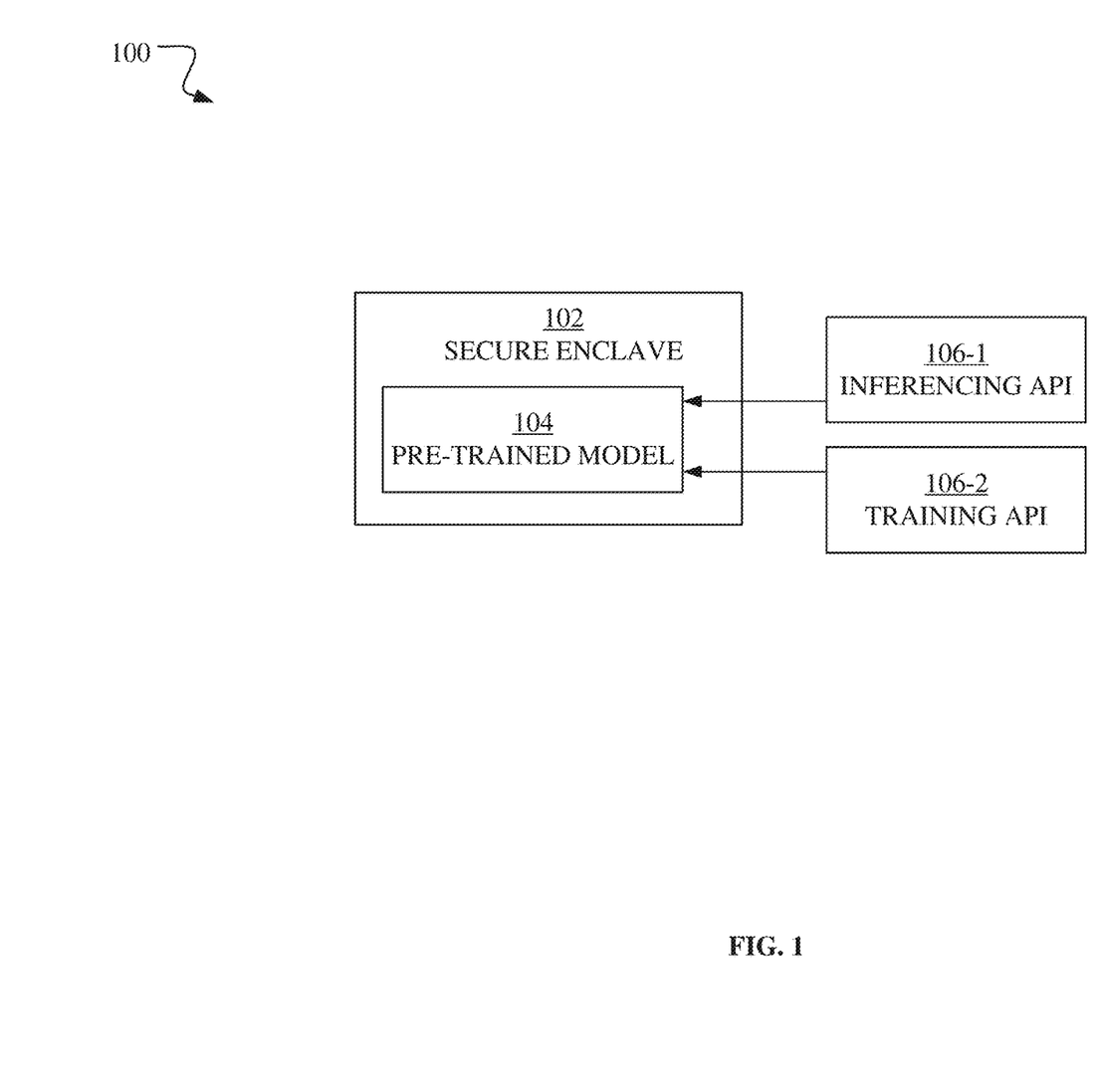
FIG. 1 is a block diagram of a system for private transfer learning, in accordance with some embodiments of the present disclosure.

FIG. 1 is a block diagram of a system 100 for private transfer learning, in accordance with some embodiments of the present disclosure. The system 100 includes a secure enclave 102 having a pre-trained model 104, inferencing API 106-1, and training API 106-2. The secure enclave 102 can be a predetermined portion of system memory of a computer device (not shown) that is reserved for secure operations, i.e., a trusted execution environment (TEE).

According to some embodiments, the system 100 can be used to control the dissemination and use a trained deep neural network model, i.e., the pre-trained model 104. The system 100 can allow use of the pre-trained model 104 for inferencing in unmodified form and allow the pre-trained model 104 to be customized through task-specific training. Additionally, the system 100 can provide these advantages while retaining control over how the pre-trained model 104 is used and/or propagated. In the system 100, the pre-trained model 104 can be suitable for training by one or more users, which can provide for training or refinement using private inputs from one or more parties.

The secure enclave 102 can include a key (not shown) that is restricted to use within the secure enclave 102. Secure operations can be performed by computer applications that run in the secure enclave 102. In order to secure these operations, the instructions of the computer application are encrypted with the key and written to memory locations in the secure enclave 102. Additionally, before execution by a processor (not shown), the instructions are read from these memory locations and decrypted with the key. Accordingly, a malicious actor, e.g., a hacker, attempting to read the instructions of the secured operations from the secure enclave 102 is limited to reading the encrypted instructions. Without the key, the malicious actor cannot determine the actual instructions, and thus the operations can be secure.

For example, the pre-trained model 104 can be a computer application that is run in the secure enclave 102. According to some embodiments, the pre-trained model 104 can be a DNN model trained to perform a generic task. Additionally, the pre-trained model 104 can be encrypted before being copied to the secure enclave 102. This involves an additional level of encryption to the key encryption described above with respect to the secure enclave 102. In some embodiments, the manufacturer of the pre-trained model can encrypt the code for the architecture, weights, and biases of the pre-trained model 104 in an encrypted distribution blob with two API functions: an inferencing API 106-1 and a training API 106-2. Data introduced with labels can be input to the inferencing API 106-1 for a back-propagation pass through the pre-trained model 104. Data introduced without labels can be input to the training API 106-2 for a forward pass through the pre-trained model 104. In this way, the system 100 can provide a deep neural network for use with encryption that is restricted to being opened inside a TEE.

By merely exposing two APIs outside of the secure enclave 102, the pre-trained model 104 can be used as intended and customized for user-specific tasks and data sets. However, the pre-trained model 104 cannot be copied out of the secure enclave 102 for uncontrolled propagation to unlicensed users, modified in ways beyond a pre-determined scope, or used past a pre-determined shelf life, after which users can be motivated to download a newer version of the pre-trained model 104.

As understood by one of ordinary skill in the art, deep neural networks can operate more efficiently on graphical processing units (GPUS) than central processing units (CPUS). However, trusted execution environments may not include GPUs inside the secure enclave 102. Accordingly, data can be sent outside of the secure enclave 102 to a GPU for training and/or inferencing (in the case of relatively large pre-trained models 104). Thus, in some embodiments, the secure enclave 102 can include one or more GPUS. Additionally, the pre-trained model 104 can be configured to prohibit operation in virtualized GPU environments (in which the GPU memory may be introspected by malicious actors outside the TEE). It may also be helpful to include in the pre-trained model 104 a random shuffling of batch computations to make it more difficult for malicious actors to infer model parameters from GPU memory.

Figure 2:
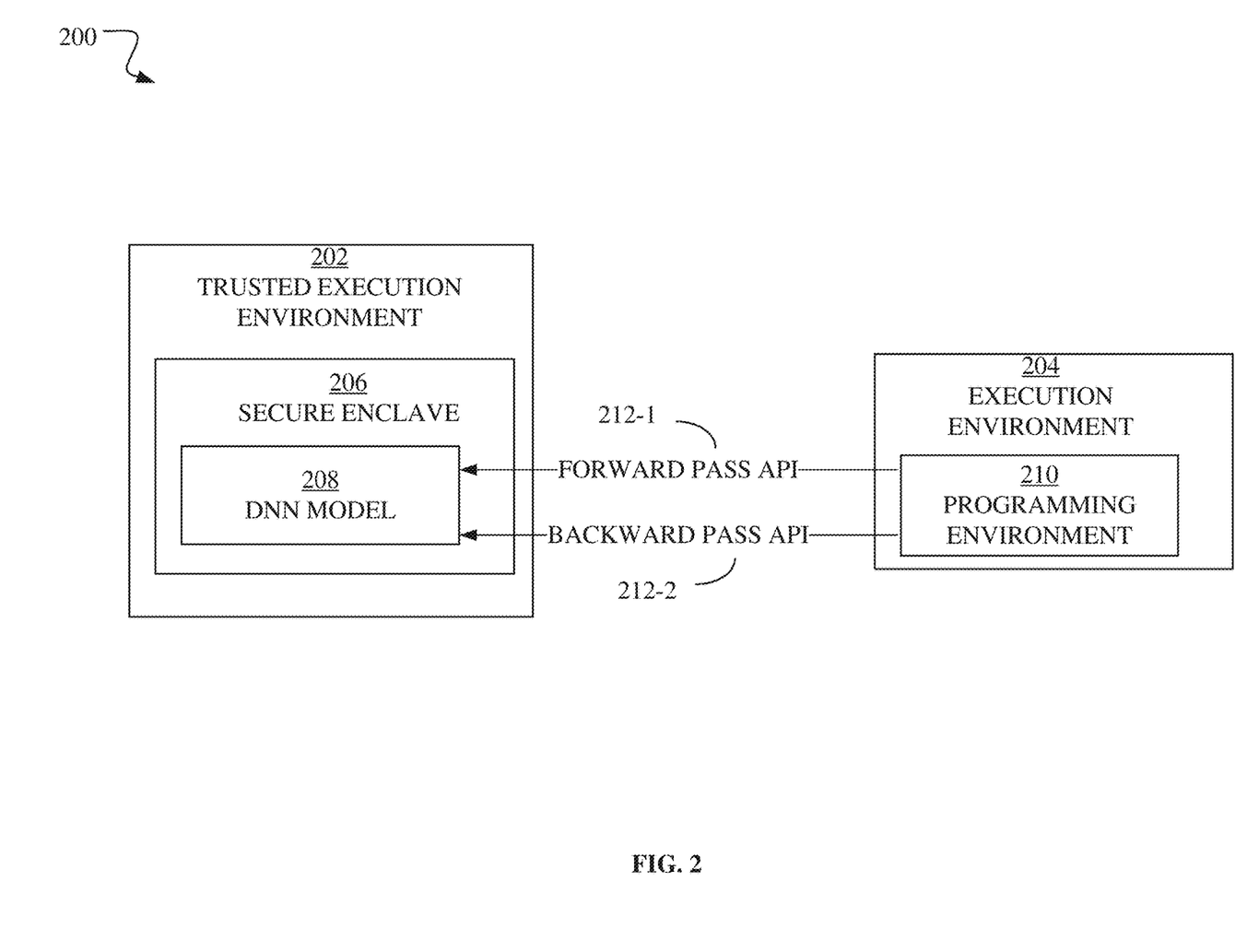
FIG. 2 is a block diagram of a system for private transfer learning, in accordance with some embodiments of the present disclosure

FIG. 2 is a block diagram of a system 200 for private transfer learning, in accordance with some embodiments of the present disclosure. The system 200 includes a TEE 202 and an execution environment 204. As stated previously, a secure enclave can be referred to as a TEE. Additionally, the term TEE can refer to a larger group of dedicated memory elements, such as the TEE 202. In the system 200, the TEE 202 includes a secure enclave 206, which may be similar to the secure enclave 102 described with respect to FIG. 1. The TEE 202 can also include additional memory elements, such as an encryption key (not shown) for the secure enclave 206.

The execution environment 204 can be a group of dedicated memory elements that store computer processor instructions. In contrast to the trusted execution environment 202 and the secure enclave 206, the execution environment 204 can be open, meaning the memory locations can be read by malicious users and otherwise. The execution environment 204 can include a programming environment 210, which can be a portion of the execution environment 204 wherein a DNN coding platform can be executing. DNN coding platforms can refer to computer software architectures wherein a data scientist, for example, can build, test, and run models, such as the DNN model 208. Accordingly, the programming environment 210 can include computer applications that invoke executions of a DNN model 208 in the secure enclave 206 of the trusted execution environment 202 by making calls to the forward pass (inferencing) API 212-1 and backward pass (training) API 212-2. Herein, these APIS are referred to individually, as described above, and collectively, as APIS 212.

The secure enclave 206 can include the DNN model 208, which may be similar to the pre-trained model 104 described with respect to FIG. 1. Referring back to FIG. 2, the DNN model 208 can be, for example, a relatively large Convolutional DNN Model that is trained for object recognition for relatively small objects within relatively large images. Such DNN models can be useful in hyperspectral satellite photography, where relatively large ranges of the electromagnetic spectrum are captured in images of the Earth from satellites. Thousands of GPU-hours can be spent training such models to relatively high levels of accuracy. Training such models can consume considerable financial expenses as well. Further, the architecture of the DNN model 208 may use valuable, advanced proprietary techniques not widely known, and thus can implicate security constraints to prevent corporate or other types of espionage.

In another example, the DNN model 208 can be a relatively large language model that is trained for predictive text generation. Predictive text generation refers to a technology where one key or button can represent multiple characters, such as on the numeric keypads of mobile computing devices. In this way, each selection of a key can result in a prediction of the word that the user is entering. Accordingly, the user can select a predicted word based on a few key selections instead of typing an entire word. Predictive text generation can also incorporate proprietary architectural techniques and can take thousands of processing hours to train. Such a DNN model 208 can be further trained with relatively less training time to perform more complex tasks, such as, question-answering, grammar parsing, text summarization, and report generation on a relatively broad range of topics. Further, the range of topics can be made even broader in specific domains through additional training. Such a DNN model 208 can provide relatively large financial value, which could be undermined if the DNN model 208 is leaked into a public space where the DNN model 208 could be replicated without providing the generator of the DNN model 208 any compensation. Accordingly, embodiments of the present disclosure can secure the DNN model 208 to prevent such a scenario.

Because the forward pass API 212-1 and backward pass API 212-2 execute within the secure enclave 206 of the trusted execution environment 202, any calls from the unsecured execution environment 204 to execute these APIS 212 are validated for authority to invoke the API calls to avoid execution of the DNN model 208 by a malicious actor. Accordingly, the APIS include authentication and authorization based on credentials programmed into the encrypted executable of the DNN model 208. This allows fine control of how the DNN model 208 is used, by whom, how much, and in what specific ways. Accordingly, the APIS 212 can include access controls that allow the limitation of the training and inferencing uses of the DNN model 208. Additionally, these access controls can provide telemetry that can provide auditing and performance metrics regarding the DNN model 208 back to the provider of the DNN model 208. In this way, the DNN model 208 can be suitable for distribution to other parties without risk of the model being introspected (short of state-sponsored attacks). In some embodiments, the DNN model 208 can be licensed according to different sets of use rights. Accordingly, the use of the APIS can be restricted in accordance with these rights. For example, the use can be limited to execution of the backward pass API 212-2 or allowed for both APIS 212. The use can also be allowed for use for a predetermined time period.

In some embodiments, the uses of the DNN model 208 can also include hyperparameter tuning. With hyperparameter tuning, the forward pass API 212-1 can allow DNN model users to define the selection of parameters that configure ways in which the DNN model 208 learns. Hyperparameters can include optimization algorithms, such as ADAM and One-Cycle, learning rate(s), number of epochs of training, layer locking, etc.

In some embodiments, the uses of the DNN model 208 can allow for the selection of more than one possible architectural variant of the DNN model 208. For example, the body of the DNN model 208 can be used with another DNN model head for multi-category or single-category classification. The body of the DNN model 208 can refer to a portion of the model logic. The model logic can be arranged in layers, wherein the first layers include the initial logic and the last layers include the final logic of the DNN model 208. Accordingly, the head of a DNN model can refer to a last layer or last few layers of the DNN model logic. In some embodiments, the architectural variant can involve repurposing a DNN model 208 from a generative DNN to a classifier. A generative DNN refers to a DNN model that generates labeled inputs for a classifying DNN. The classifying DNN refers to a DNN model that labels, i.e., classifies, inputs. In some embodiments, these and other potential architectural variants can be selectable within the forward pass API 212-1 and backward pass API 212-2.

In some embodiments, the system 200 can be integrated with existing DNN coding platforms such as PyTorch and Tensorflow®. In this way, the system 200 can allow easier packaging of the DNN model 208 into an encrypted distribution blob. Additionally, integrating the system 200 with existing DNN coding platforms can also enable data scientists to more efficiently perform inferencing and training on the DNN model 208 by using the same coding environments and commands to which they may already be accustomed.

Figure 3:
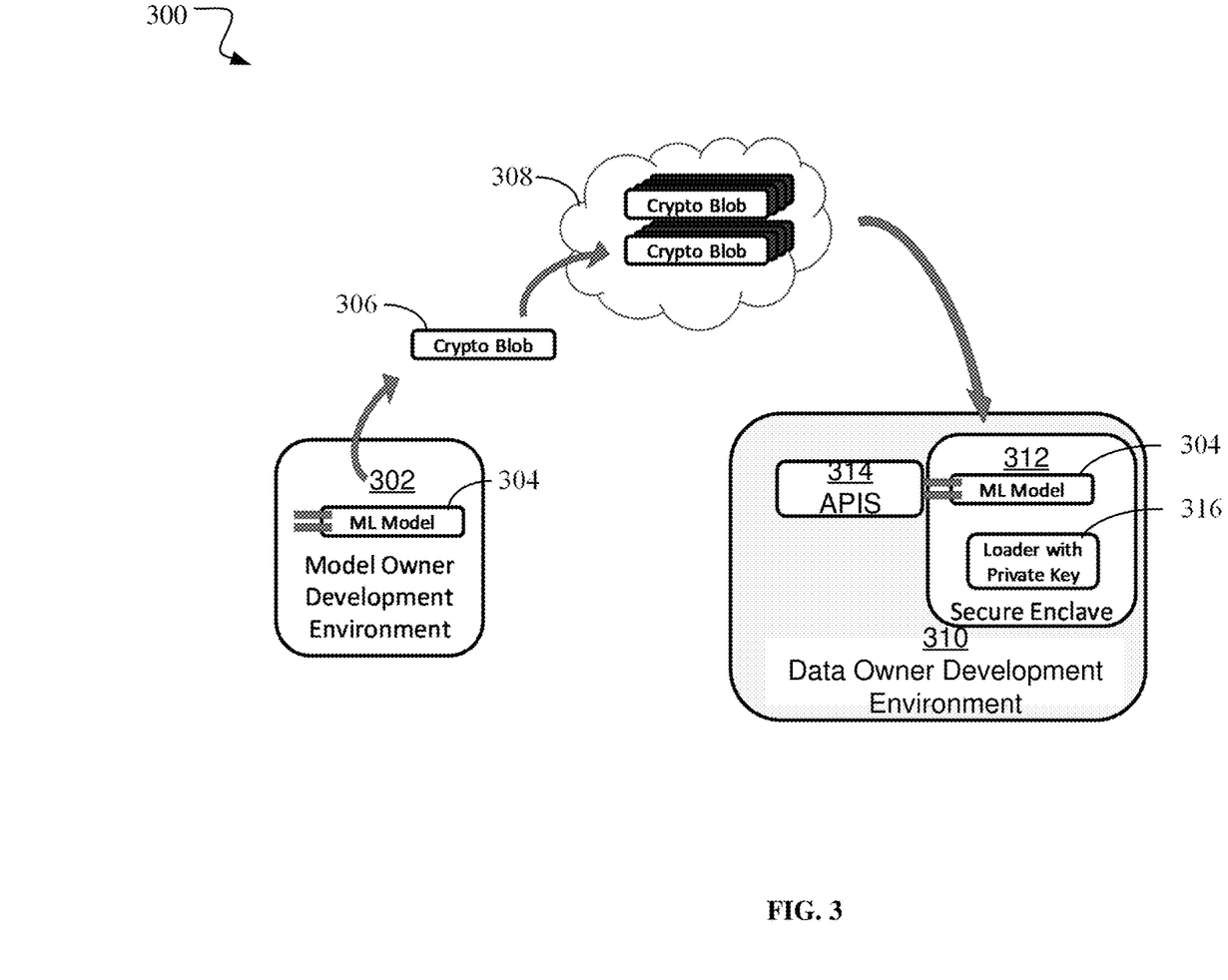
FIG. 3 is a data flow diagram of a process for private transfer learning, in accordance with embodiments of the present disclosure.

FIG. 3 is a data flow diagram of a process 300 for private transfer learning, in accordance with embodiments of the present disclosure. In the process 300, a model owner development environment 302 is used to generate a machine learning (ML) model 304. The model owner development environment 302 can be a private, secure, computer hardware and software architecture configured to enable data scientists and software engineers to build and train machine learning models, such as the machine learning model 304. The machine learning model 304 can be one of various types of machine learning models, ranging from a relatively simple algorithm to a DNN model, such as the DNN model 208 described with respect to FIG. 2.

Referring back to FIG. 3, the model owner may generate a crypto blob 306 from the machine learning model 304 using encryption. The crypto blob 306 can be signed and managed according to the Opal standard. The Opal standard refers to a group of security-related specifications for electronic storage devices, such as disk drives. For example, these specifications can define an encryption method for stored data that prevents unauthorized users from taking control of the device or viewing the data stored thereon. The encryption may be provided by the public-private key infrastructure (PKI), attestation, and the like. In PKI, a public key shared between two users can be used in concert with an encrypted private key to ensure that authorized users can access a secured file, such as the machine learning model 304. Attestation can involve the use of a public hashtag and clearinghouse signature to validate the integrity of a computer application, such as the machine learning model 304. Attestation can be used as a work-around for potentially maliciously coded computer instructions within a secure enclave, such as the secure enclave 206.

Referring back to FIG. 3, the model owner may store the crypto blob 306 in a cloud storage system 308 that can host a library of machine learning models, encrypted as multiple crypto blobs 306. Further, to gain access to a machine learning model from this library, a customer can subscribe to a selected model, such as the machine learning model 304. From the cloud storage system 308, the crypto blob 306 can be copied into a data owner development environment 310. The data owner development environment 310 can be a trusted execution environment, such as the TEE 202. The data owner development environment 310 can include a secure enclave 312 and APIS 314. The secure enclave 312 can be similar to the secure enclave 206 described with respect to FIG. 2. The APIS 314 can be similar to the APIS 212 described with respect to FIG. 2. The secure enclave 312 can include the machine learning model 304 and a loader with a private key 316. Thus, the secure enclave 312 has the key needed to decrypt the crypto blob 306. In embodiments of the present disclosure, the loader with the private key 316 can decrypt the crypto blob 306, thus generating the machine learning model 304 and APIS 314. Further, the secure enclave 312 can use its own key (not shown) to encrypt the instructions of the machine learning model 304 and APIS 314 before writing these instructions to the memory locations of the secure enclave 312.

While running in the secure enclave 312, the machine learning model 304 is still stored in encrypted memory, which is unreadable by privileged users, such as the administrator and the root users. The secure enclave 312 also prevents memory bus probe attacks because only the encrypted data is passed along the bus from the secure enclave 312. In this way, merely exposing the APIS 314 to users can ensure that the machine learning model 304 is not misused or distributed without authorization.

Figure 4:
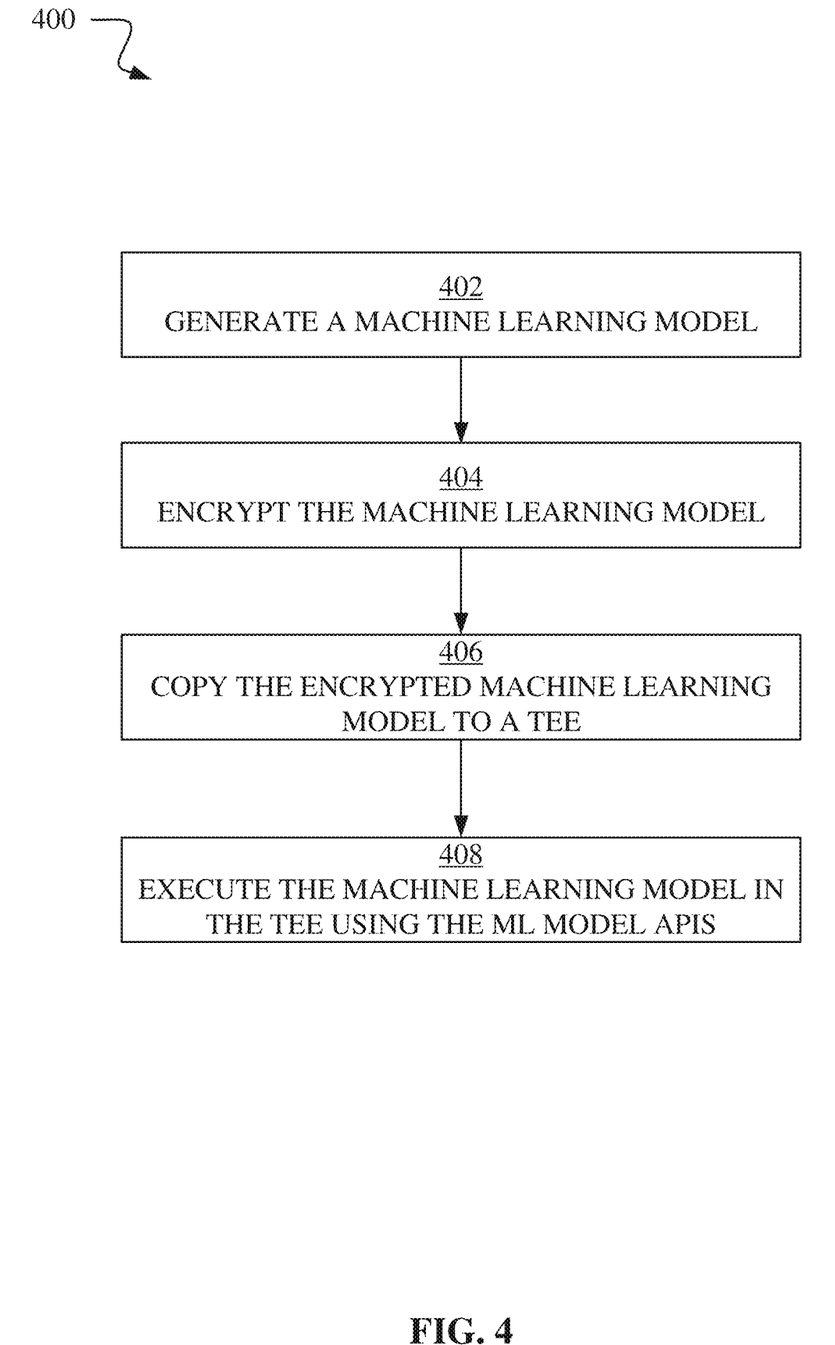
FIG. 4 is a flow chart of an example method for private transfer learning, in accordance with some embodiments of the present disclosure.

FIG. 4 is a flowchart of an example method 400 for private transfer learning, in accordance with some embodiments of the present disclosure. At block 402, a machine learning model, such as the machine learning model 304 described with respect to FIG. 3, can be generated. The machine learning model 304 can include a training application programming interface (API) and an inferencing API. The model owner can generate the machine learning model 304 in a model owner development environment, such as the model owner development environment 302 described with respect to FIG. 3.

Referring back to FIG. 4, at block 404, the machine learning model 304 can be encrypted using a predetermined encryption mechanism. For example, the encryption mechanism can include a public-private key infrastructure or attestation.

At block 406, the encrypted machine learning model can be copied to a trusted execution environment, such as the trusted execution environment 202 described with respect to FIG. 2. The encrypted machine learning model can be a crypto blob, such as the crypto blob 306 described with respect to FIG. 3.

Referring back to FIG. 4, at block 408, the machine learning model can be executed in the trusted execution environment using the inferencing API or the training API. As stated previously, the inferencing API can be used to classify objects input to the machine learning model. Additionally, the training API can be used to further refine the training of the machine learning model to a more specific task than the generic task for which the model owner has trained the machine learning model.

Figure 5:
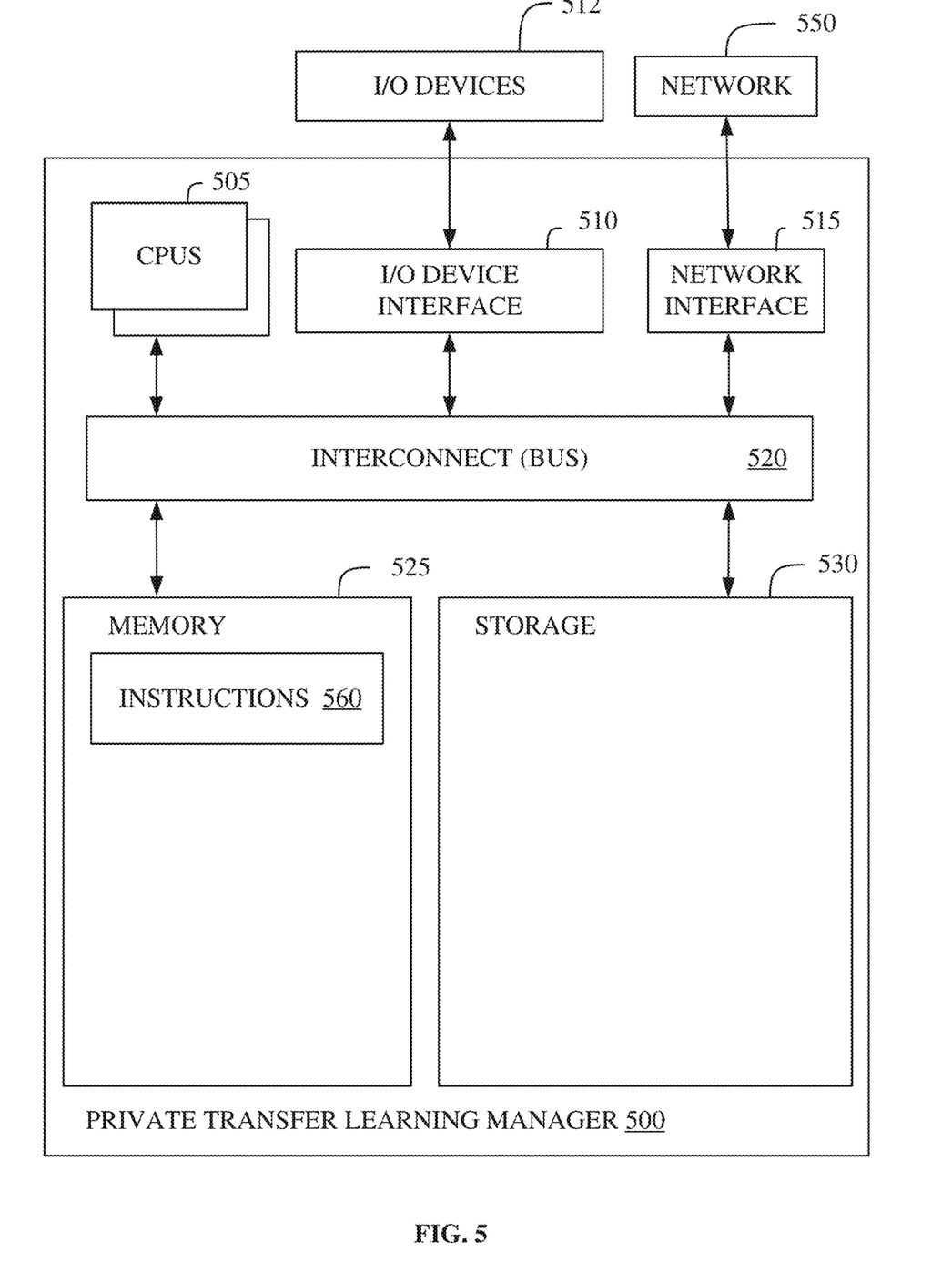
FIG. 5 is a block diagram of an example classifying chart digitization (CCD) manager, in accordance with some embodiments of the present disclosure.

Referring now to FIG. 5, illustrated is a block diagram of an example private transfer learning manager 500, in accordance with some embodiments of the present disclosure. In various embodiments, the private transfer learning manager 500 is similar to the private transfer learning manager 214 and can perform the methods described in FIG. 4 and/or the functionality discussed in FIGS. 1-3. In some embodiments, the private transfer learning manager 500 provides instructions for the aforementioned methods and/or functionalities to a client machine such that the client machine executes the method, or a portion of the method, based on the instructions provided by the private transfer learning manager 500. In some embodiments, the private transfer learning manager 500 comprises software executing on hardware incorporated into a plurality of devices.

The private transfer learning manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the private transfer learning manager 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, any of the methods of FIG. 4 and/or the functionality discussed in FIGS. 1-3.

In various embodiments, the I/O devices 512 include an interface capable of presenting information and receiving input. For example, I/O devices 512 can present information to a listener interacting with private transfer learning manager 500 and receive input from the listener.

The private transfer learning manager 500 is connected to the network 550 via the network interface 515. Network 550 can comprise a physical, wireless, cellular, or different network.

In some embodiments, the private transfer learning manager 500 can be a multi-user mainframe computer system, a single-user system, or a server computer or similar device that has little or no direct user interface but receives requests from other computer systems (clients). Further, in some embodiments, the private transfer learning manager 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary private transfer learning manager 500. In some embodiments, however, individual components can have greater or lesser complexity than as represented in FIG. 5, components other than or in addition to those shown in FIG. 5 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
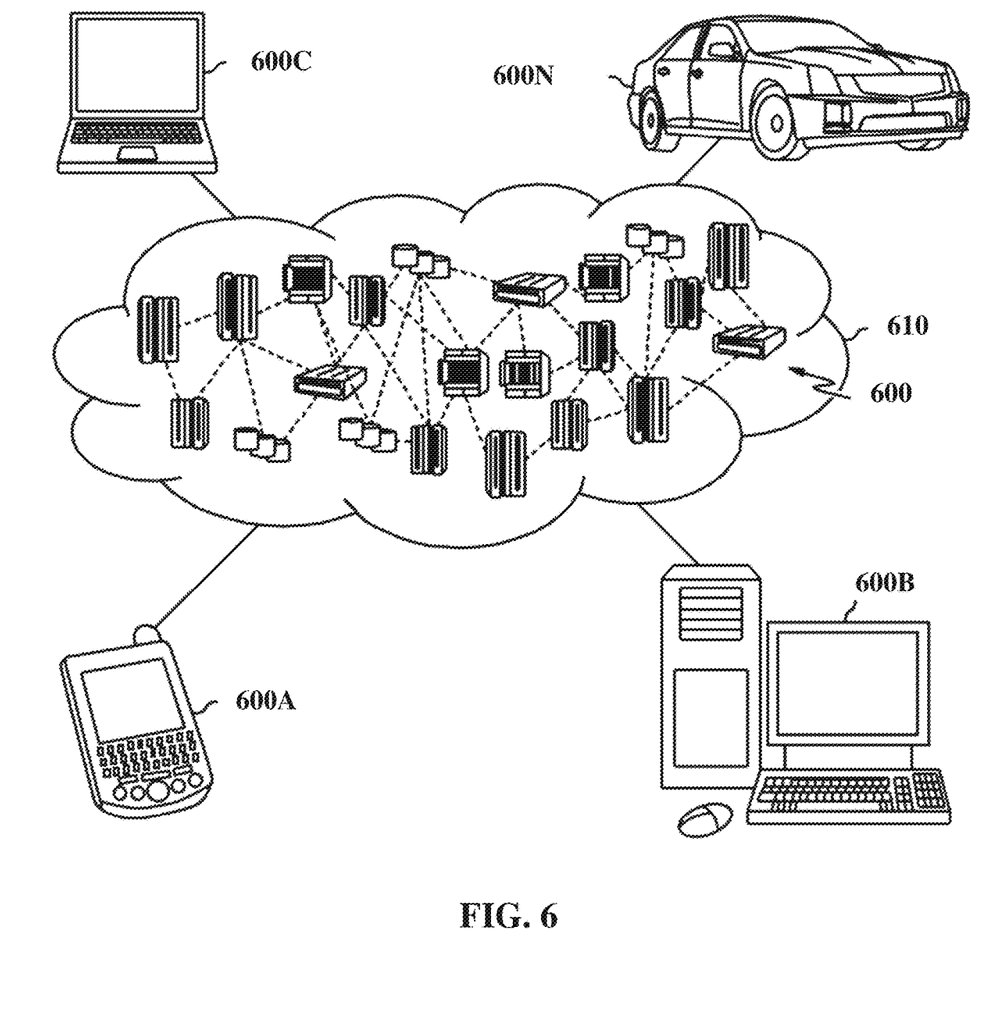
FIG. 6 depicts a cloud computing environment, according to some embodiments of the present disclosure.

Referring now to FIG. 6, which depicts a cloud computing environment 610, according to some embodiments of the present disclosure. As shown, cloud computing environment 610 includes one or more cloud computing nodes 600. The cloud computing nodes 600 can perform the methods described in FIG. 4 and/or the functionality discussed in FIGS. 1-3. Additionally, cloud computing nodes 600 can communicate with local computing devices used by cloud consumers, such as, for example, personal digital assistant (PDA) or cellular telephone 600A, desktop computer 600B, laptop computer 600C, and/or automobile computer system 600N. Further, the cloud computing nodes 600 can communicate with one another. The cloud computing nodes 600 can also be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
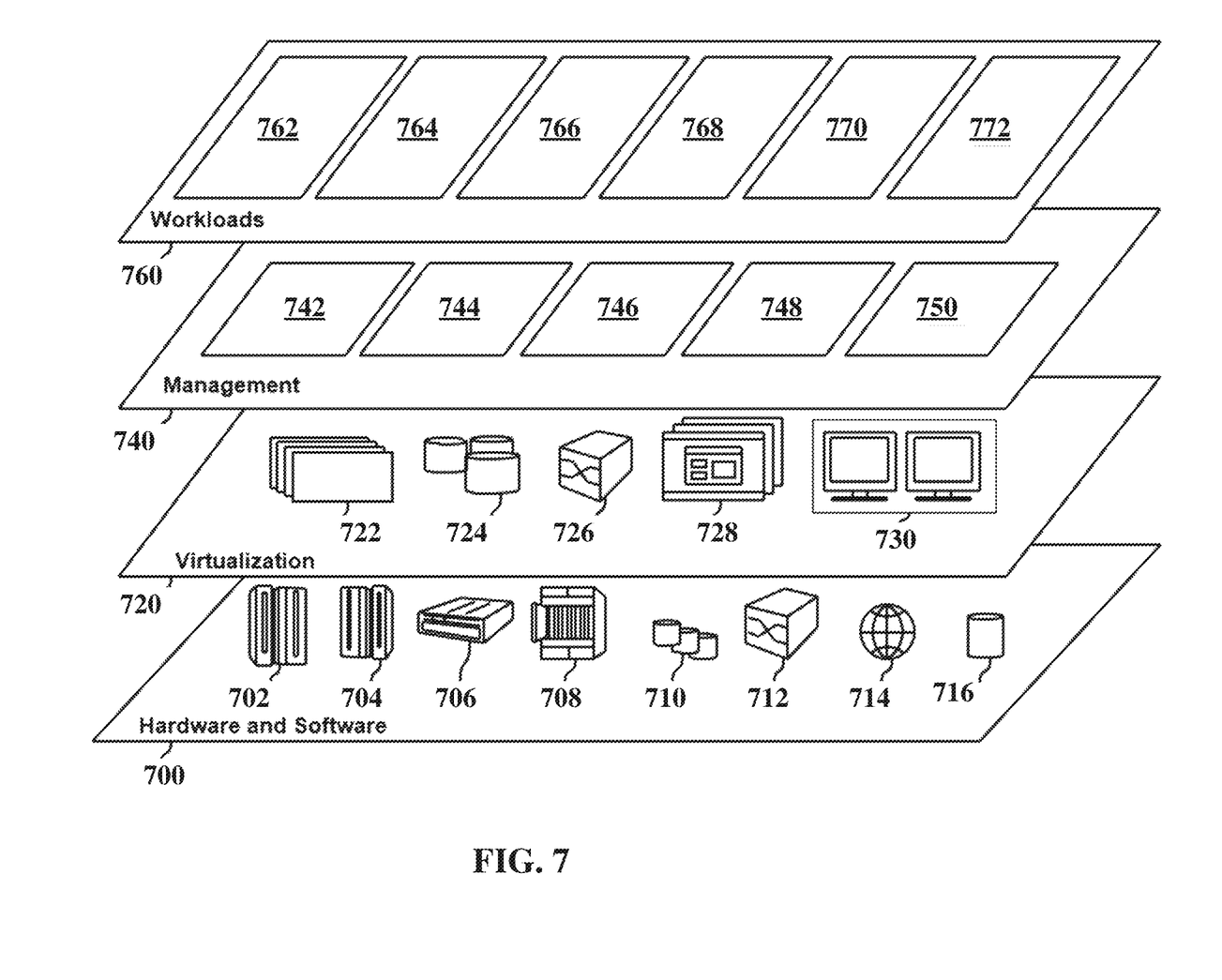
FIG. 7 depicts abstraction model layers, according to some embodiments of the present disclosure.

Referring now to FIG. 7, a set of functional abstraction model layers provided by cloud computing environment 610 (FIG. 6), according to some embodiments of the present disclosure, is shown. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities can be provided: virtual servers 722; virtual storage 724; virtual networks 726, including virtual private networks; virtual applications and operating systems 728; and virtual clients 730.

In one example, management layer 740 can provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service level management 748 can allocate suitable processing power and memory to process static sensor data. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment can be utilized. Examples of workloads and functions which can be provided from this layer include: mapping and navigation 762; software development and lifecycle management 764; virtual classroom education delivery 766; data analytics processing 768; transaction processing 770; and private transfer learning manager 772.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for private transfer learning, comprising:
   providing authorized use of a machine learning model that is trained to perform a generic task by a deep neural network (DNN), by:
   encrypting the machine learning model using a predetermined encryption mechanism, wherein the machine learning model comprises a training application programming interface (API), an inferencing API, and credentials that:
   are programmed into the machine learning model;
   define who can train the machine learning model;
   define how the machine learning model can be trained; and
   authenticate a call from an unsecured execution environment;
   copying the encrypted machine learning model to a trusted execution environment; and
   performing private transfer learning by training the machine learning model to perform a task that is more specific than the generic task by executing the training API in a secure enclave of the trusted execution environment, wherein training the machine learning model comprises authenticating, using the credentials, a call to execute the training API from the unsecured execution environment.

2. The method of claim 1, further comprising generating an inference from the machine learning model by executing the inferencing API in the secure enclave of the trusted execution environment.

3. The method of claim 1, further comprising generating a combination of a body of the machine learning model with a head of an additional machine learning model in the trusted execution environment.

4. The method of claim 3, further comprising performing the inferencing API for the combination.

5. The method of claim 3, further comprising performing the training API for the combination.

6. A computer program product comprising program instructions stored on a computer readable storage medium, wherein the computer readable storage medium is not a transitory signal per se, the program instructions executable by a processor to cause the processor to perform a method comprising:
   providing authorized use of a machine learning model that is trained to perform a generic task by a deep neural network (DNN), by:
   encrypting the machine learning model using a predetermined encryption mechanism, wherein the machine learning model comprises a training application programming interface (API), an inferencing API, and credentials that:
   are programmed into the machine learning model;
   define who can train the machine learning model;
   define how the machine learning model can be trained; and
   authenticate a call from an unsecured execution environment;
   copying the encrypted machine learning model to a trusted execution environment; and
   performing private transfer learning by training the machine learning model to perform a task that is more specific than the generic task by executing the training API in a secure enclave of the trusted execution environment, wherein training the machine learning model comprises authenticating, using the credentials, a call to execute the training API from the unsecured execution environment.

7. The computer program product of claim 6, the method further comprising generating an inference from the machine learning model by executing the inferencing API in the secure enclave of the trusted execution environment.

8. The computer program product of claim 6, the method further comprising generating a combination of a body of the machine learning model with a head of an additional machine learning model in the trusted execution environment.

9. The computer program product of claim 8, the method further comprising performing the inferencing API for the combination.

10. The computer program product of claim 8, the method further comprising performing the training API for the combination.

11. A system comprising:
    a computer processing circuit; and
    a computer-readable storage medium storing instructions, which, when executed by the computer processing circuit, are configured to cause the computer processing circuit to perform a method comprising:
    providing authorized use of a machine learning model that is trained to perform a generic task by a deep neural network (DNN), by:

encrypting the machine learning model using a predetermined encryption mechanism, wherein the machine learning model comprises a training application programming interface (API), an inferencing API, and credentials that:
are programmed into the machine learning model;
define who can train the machine learning model;
define how the machine learning model can be trained; and
authenticate a call from an unsecured execution environment;
copying the encrypted machine learning model to a trusted execution environment; and
performing private transfer learning by training the machine learning model to perform a task that is more specific than the generic task by executing the training API in a secure enclave of the trusted execution environment, wherein training the machine learning model comprises authenticating, using the credentials, a call to execute the training API from the unsecured execution environment.

12. The system of claim 11, the method further comprising generating an inference from the machine learning model by executing the inferencing API in the secure enclave of the trusted execution environment.

13. The system of claim 11, the method further comprising generating a combination of a body of the machine learning model with a head of an additional machine learning model in the trusted execution environment.

14. The system of claim 13, the method further comprising performing the inferencing API for the combination.

15. The system of claim 13, the method further comprising performing the training API for the combination.

16. A system comprising:
a computer processing circuit;
a graphical processing circuit (GPU); and
a computer-readable storage medium storing instructions, which, when executed by the computer processing circuit, are configured to cause the computer processing circuit to perform a method comprising:
providing authorized use of a machine learning model that is trained to perform a generic task by a deep neural network (DNN), by:
encrypting the machine learning model using a predetermined encryption mechanism, wherein the machine learning model comprises a training application programming interface (API), an inferencing API, and credentials that:
are programmed into the machine learning model;
define who can train the machine learning model;
define how the machine learning model can be trained; and
authenticate a call from an unsecured execution environment;
copying the encrypted machine learning model to a trusted execution environment; and
performing private transfer learning by training the machine learning model to perform a task that is more specific than the generic task by executing the training API in a secure enclave of the trusted execution environment, wherein training the machine learning model comprises authenticating, based on the credentials, a call to execute the training API from the unsecured execution environment.

17. A computer-implemented method for private transfer learning, comprising:
providing authorized use of a machine learning model that is trained to perform a generic task by a deep neural network (DNN), by:
encrypting the machine learning model using a predetermined encryption mechanism, wherein the machine learning model comprises a training application programming interface (API), an inferencing API, and credentials that:
are programmed into the machine learning model;
define who can train the machine learning model;
define how the machine learning model can be trained; and
authenticate a call from an unsecured execution environment;
copying the encrypted machine learning model to a trusted execution environment; and
performing private transfer learning by training the machine learning model to perform a task that is more specific than the generic task by executing the training API in a secure enclave of the trusted execution environment, wherein training the machine learning model comprises authenticating, based on the credentials, a call to execute the training API from the unsecured execution environment.

18. The method of claim 17, wherein:
the machine learning model comprises a deep neural network (DNN) model;
the DNN model is trained to perform a generic task; and
the training API trains the DNN model to perform a task that refines the generic task to a more specific task than the generic task.

* * * * *